(No Model.)
J. P. PUTNAM.
TRAP FOR WASH BASINS.
No. 360,480. Patented Apr. 5, 1887.
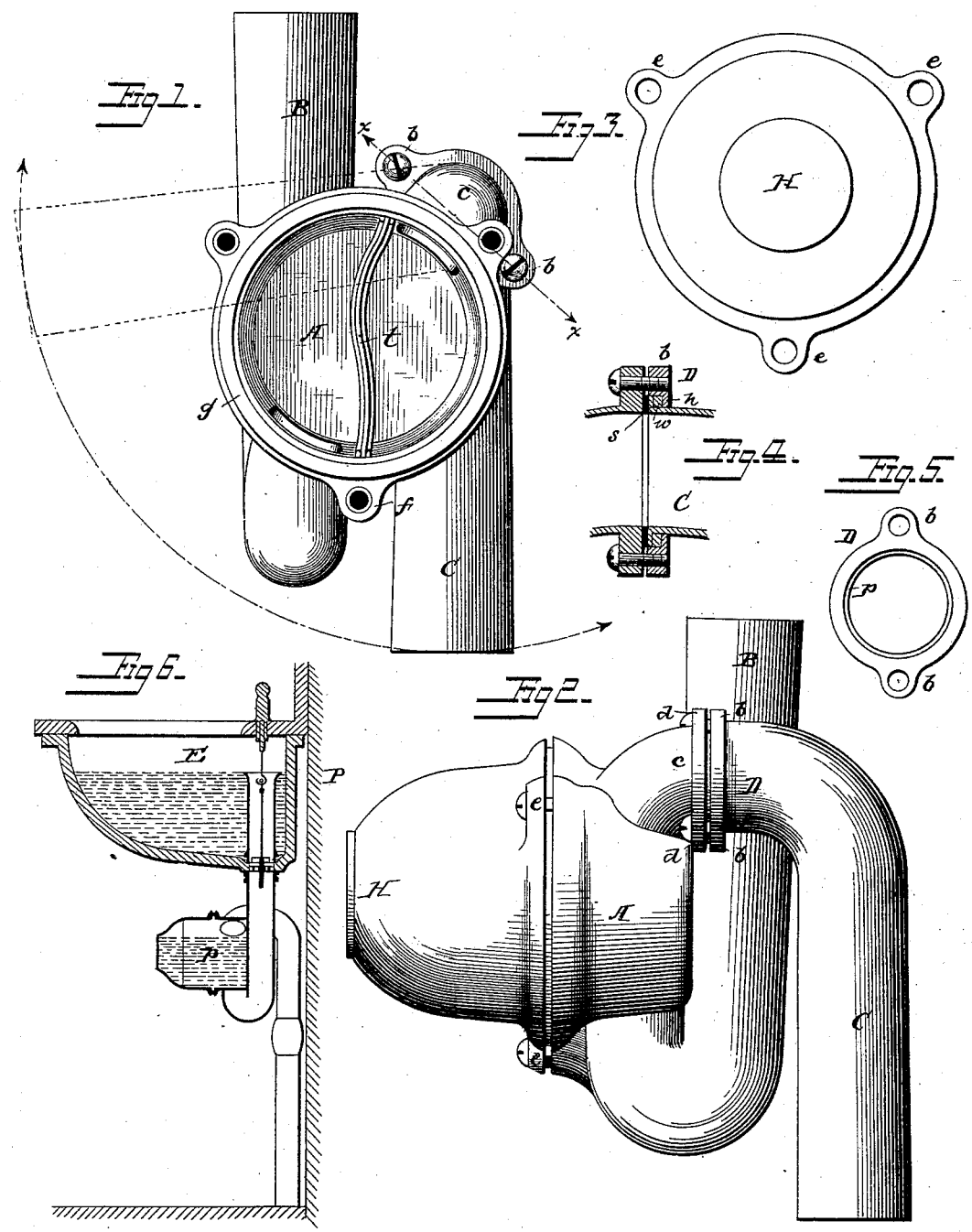

UNITED STATES PATENT OFFICE.

JOHN PICKERING PUTNAM, OF BOSTON, MASSACHUSETTS.

TRAP FOR WASH-BASINS.

SPECIFICATION forming part of Letters Patent No. 360,480, dated April 5, 1887.

Application filed January 10, 1887. Serial No. 223,937. (No model.)

*To all whom it may concern:*

Be it known that I, JOHN PICKERING PUTNAM, of Boston, Massachusetts, have invented an Improvement in Traps for Wash-Basins and Similar Fixtures, of which the following is a specification.

The invention relates to traps having an upper and lower bend with a bulge or chamber between the two bends.

The object of the invention is to provide a trap for general use that may be adjusted and put together compactly within a very limited space; and one part of the invention consists in so connecting the inlet and outlet pipes of the trap with the chamber between them that the long arms of both shall be behind the chamber while one may be swiveled behind the other.

Other parts of the invention consist in details of construction, and more especially in the method by which the parts are connected.

In the drawings, Figure 1 is a front elevation of a trap embodying my invention with the clean-out cap removed. Fig. 2 is a side elevation of the trap. Figs. 3, 4, and 5 represent details in the construction, Fig. 4 being a section taken on the line $xx$ of Fig. 1. Fig. 6 represents the trap as attached to a wash-basin.

A is the chamber, B the inlet-pipe, and C the outlet-pipe, of the trap. The inlet-pipe B, containing the lower bend of the trap, is cast with the chamber, or so attached thereto that its long or perpendicular arm, which is to be connected with the fixture, is behind the chamber. The outlet-pipe C, furnishing the upper bend to the trap, is a separate casting, and is provided with a flange, $s$, upon the end of its short arm, as shown.

D is a coupler, passing over the pipe C against the flange $s$, as shown, and has a shoulder, $h$, within which the flange $s$ on the pipe C fits, and is provided with ears $b\ b$, as shown. The chamber A, at its upper back corner, on either side of the long arm of the inlet-pipe B, has a hollow projection, $c$, furnished with similar ears, $d\ d$, and screws passing through both sets of ears draw the outlet-pipe and chamber together. A washer, $w$, is shown between said flange $s$ and said shoulder $h$. The plane of the joint between the inlet-pipe C and the chamber A, or the hollow projection $c$ on the chamber, is perpendicular and parallel with the front and rear faces of the chamber, and the short arm of the outlet-pipe C is of sufficient length to bring its long arm just back of a plane tangential to the rear of the inlet-pipe B. Accordingly, the outlet-pipe C may be swiveled in any direction before the joint between it and the chamber is tightened, and it is immaterial whether the free end of the outlet-pipe is thereafter to make a connection at the right or at the left of the inlet-pipe. This swiveling feature might be obtained by causing the outlet-pipe C to connect with the chamber A more directly, by means of a hole or opening in the back of the chamber, there being screw-holes in said back and around said opening corresponding to the screw-holes in the ears of the coupler. This construction would require the bolts for drawing up the coupler to be tightened before the clean-out cap is put on.

H is the clean-out cap. It is provided with ears $e\ e\ e$, and is screwed to the chamber A by bolts passing through these ears and similar ears, $f\ f\ f$, on the front rim of the chamber, as shown. $g$ is a groove in the front rim of the chamber, to receive a packing between the cap and chamber. Within the chamber (see Fig. 1) a groove, $t$, is shown, to receive a partition, $p$, Fig. 6, to deflect the water in the chamber.

The advantage of placing both pipes behind the chamber, the fixed as well as the swiveling pipe, is illustrated at Fig. 6 of the drawings, in which P represents the wall of a room, and E the fixture to which the trap is applied. The outlet of the fixture, as is frequently the case, is very near to the wall of the room, and as the inlet-pipe B of the trap descends perpendicularly from the outlet there is at best but little room in which the plumber can make his connections; but it is obvious that if the pipe B be placed at one side of the chamber A it will carry the chamber A farther back, so that the plumber will work at still greater disadvantage, even if the short arm of the outlet-pipe be so shortened that it could be possible to swivel the outlet-pipe between the chamber and the wall of the room.

It will be observed that both the clean-out cap and the outlet-pipe are secured to the body of the chamber—one in front and the other behind—by bolts whose heads lie in planes parallel with the front and rear faces of the chamber, and are turned or screwed up from the front. This is an important feature of the invention, for it follows that, whereas the contracted space in which traps for wash-basins and like fixtures, especially bath-tubs, are generally placed, renders it difficult either to solder the outlet-pipe behind the chamber or to secure it to the back of the chamber by a coupling device operated by a wrench or by the hand in the usual manner, it becomes possible through my invention, the joints being in parallel planes, to readily tighten not only the joint between the clean-out cap and the chamber, but also the joint between the outlet-pipe and the chamber, by a screw-driver, in any position in which the bolt-heads of either joint are accessible from the front by a screw-driver.

I claim—

1. In a trap having an upper and a lower bend and a chamber between them, the combination, with the chamber, of two bent pipes, the long arms of both being behind said chamber and one swiveled to swing behind and past the other, substantially as described.

2. In a trap for a wash-basin or similar fixture, the combination, with a chamber provided with a rear opening and screw-holes about said opening, of a bent pipe provided with a flange, a coupler fitted upon said bent pipe against said flange and provided with similar screw-holes, whereby the bolts may be turned from the front, and bolts passing through both sets of screw-holes, substantially as described.

3. In a trap for a wash-basin or similar fixture, the combination, with a chamber, of a clean-out cap and a swiveling pipe, the one in front of the said chamber and the other behind said chamber, and the respective joints between said chamber and said clean-out cap and between said chamber and said swiveling pipe being in planes parallel with the front and rear faces of said chamber, and made tight by bolts accessible from the front, substantially as described.

J. PICKERING PUTNAM.

Witnesses:
  WALDRON BATES,
  FRANK. F. A. SCHILLER.